(12) United States Patent
Stewart et al.

(10) Patent No.: US 8,165,118 B2
(45) Date of Patent: Apr. 24, 2012

(54) VOICE OVER CONTENT CENTRIC NETWORKS

(75) Inventors: Paul J. Stewart, Los Altos, CA (US);
Van L. Jacobson, Woodside, CA (US);
Michael F. Plass, Mountain View, CA (US); Diana K. Smetters, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1010 days.

(21) Appl. No.: 12/123,344

(22) Filed: May 19, 2008

(65) Prior Publication Data
US 2009/0285209 A1 Nov. 19, 2009

(51) Int. Cl.
*H04L 12/28* (2006.01)
*H04L 12/56* (2006.01)

(52) U.S. Cl. ........................................ 370/389; 370/401

(58) Field of Classification Search ........................ None
See application file for complete search history.

(56) References Cited

U.S. PATENT DOCUMENTS

| | | | |
|---|---|---|---|
| 2008/0005056 A1 | 1/2008 | Stelzig | |
| 2008/0123862 A1* | 5/2008 | Rowley | 380/279 |
| 2008/0320148 A1* | 12/2008 | Capuozzo et al. | 709/227 |
| 2009/0013324 A1* | 1/2009 | Gobara et al. | 718/104 |
| 2009/0097631 A1* | 4/2009 | Gisby et al. | 379/211.02 |

* cited by examiner

*Primary Examiner* — Chirag Shah
*Assistant Examiner* — Minh-Trang Nguyen
(74) *Attorney, Agent, or Firm* — Shun Yao; Park, Vaughan, Fleming & Dowler LLP (57) ABSTRACT

A system for facilitating voice calls over a content centric network (CCN) receives from a CCN user an expressed interest in receiving voice calls directed to the CCN user, wherein information in the CCN can be addressed, located, and disseminated by its content identifier and wherein data packets in the CCN are self-authenticating. Next, the system receives from a second network a packet for a voice call directed to the CCN user. The system then forwards to the CCN user the packet received from the second network with a CCN identifier corresponding to the interest expressed by the CCN user and forwards a packet from the CCN user for the voice call to the second network.

20 Claims, 8 Drawing Sheets

```
INVITE sip:bob@abcd.com SIP/2.0
Via:     SIP/2.0/UDP efgh.com:5060
From:    alice@efgh.com
To:  bob
Call-ID:  12345600@efgh.com
CSeq:  1 INVITE
Contact:  alice@efgh.com
Content-Type:  application/sdp
Content-Length:  147
[...]
```

```
<ccn>
    <content>
        <pathname="abcd.com"type="domain">
        <pathname="bob"type="principal">
        <pathname="sip"type="protocol">
        <pathname="invite"type="verb">

<pathname="12345600@efgh.com"type="id">
        <data>
            INVITEsip:bob@abcd.com
            [...]
        </data>
    </content>
</ccn>
```

VOICE OVER CONTENT CENTRIC NETWORKS

RELATED APPLICATION

The subject matter of this application is related to the subject matter in the following provisional applications:

U.S. Provisional Patent Application No. 61/054,067, entitled "CONTENT-CENTRIC NETWORKING," by inventor Van Jacobson, filed 16 May 2008; and U.S. Provisional Patent Application No. 61/054,044, entitled "CONTENT-CENTRIC NETWORKING: POLICY ROUTING AND FIREWALLING," by inventors Van Jacobson and Diana K. Smetters, filed 16 May 2008;

the disclosures of which are incorporated by reference in their entirety herein.

FIELD

The present disclosure relates generally to facilitating voice calls over a data network. More specifically, the present disclosure relates to a method for facilitating a voice call over a content centric network.

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of data can only receive the data by explicitly requesting the data from an address (e.g., IP address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today's ubiquitous, relentlessly growing Internet. People now expect a lot more from the Internet than what the ARPAnet was designed for. Ideally, an Internet user should have access to any content, anywhere, at any time—a task that is difficult to perform with the current location/device-binding IP protocol.

Content centric networks (CCN), also referred to as "content based networks," brings a new approach to data transport in a network. Instead of having network traffic viewed at the application level as end-to-end conversations over which content travels, content is requested or returned based on the name given to it, and the network is responsible for routing data, or "content," from the provider to the consumer. While content centric networks can significantly improve the efficiency and usability of content dissemination, providing real-time applications, such as voice calls, over such networks can also be advantageous.

SUMMARY

One embodiment of the present invention provides a system for facilitating voice calls over a content centric network (CCN). During operation, the system receives from a CCN user an expressed interest in receiving voice calls directed to the CCN user, wherein information in the CCN can be addressed, located, and disseminated by its content identifier and wherein data packets in the CCN are self-authenticating. Next, the system receives from a second network a packet for a voice call directed to the CCN user. The system then forwards to the CCN user the packet received from the second network with a CCN identifier corresponding to the interest expressed by the CCN user and forwards a packet from the CCN user for the voice call to the second network. Next, the system allows a device in the second network to initiate and maintain the voice call directed to the CCN user based on the identifier associated with CCN user, without maintaining state information associated with the voice call. The system further allows the voice call to be terminated when no interest corresponding to the voice call is received from the CCN user for a predetermined period.

In one variation on this embodiment, the system expresses an interest in receiving outbound voice call requests from one or more CCN callers. The system further receives an outbound voice call request from a CCN caller and an interested expressed by the CCN caller in receiving packets associated with the outbound voice call. The system forwards the outbound voice call request to a second network. In response, the system receives a packet associated with the outbound voice call from the second network. Next, the system forwarding the packet associated with the outbound voice call to the CCN caller using a CCN name associated with the interest expressed by the CCN caller. The system allows the CCN caller to initiate and maintain the outbound voice call, and allows the outbound voice call to be terminated when no interest corresponding to the outbound voice call is received from the CCN caller for a predetermined period In one variation on this embodiment, the system translates data packets between the data packet format associated with the second network and the data packet format associated with the CCN.

In one variation on this embodiment, the system terminates the voice call after receiving from the CCN an expressed interest in not receiving voice calls directed to the CCN user.

In one variation on this embodiment, the system shares the load of facilitating voice calls to the CCN among a number of proxy servers, each of which is capable of performing aforementioned operations, wherein a respective proxy server does not maintain state information associated with a voice call.

In one variation on this embodiment, the system digitally signs a respective data packet associated with the voice call such that the data packet can be verified by one or more nodes in the CCN.

In one variation on this embodiment, the system receives information about a public key associated with a CCN device, configures a publicly available directory of public keys, thereby allowing second network endpoints to discover those keys, and secures communication by using an existing end-to-end second network security standard based on the public key.

In one variation on this embodiment, the system receives information indicative of which CCN devices are online, which CCN users have not expressed an interest in receiving voice calls, and which CCN users have expressed an interest in forwarding their calls, and provides the received information outside of the CCN.

In a further embodiment, the system forwards the voice call to a CCN voicemail system based on the received information.

In a further embodiment, the system forwards the voice call outside of the CCN based on the received information.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

In a content-centric network (CCN), content is identified, requested, and disseminated based on the content's name, as opposed to a name of a content container, such as a file, which does not indicate the substance of the content. In contrast, in a conventional non-CCN network, traffic is viewed at the application level as end-to-end conversations over which content travels by destination rather than name.

Unlike IP addresses, a content name does not indicate the location of the content, and the CCN is responsible for routing the content. In a CCN, content names are persistent and content-specific. That is, if one changes the content of a file or data object, the content is effectively associated with a new name. This persistency can be achieved with an explicit versioning mechanism, where, for example, the new content can be "version 4" of a given name. The persistency can also be achieved implicitly. For example, contents can be associated with not only their human-established names, but also with authentication metadata (e.g., a digital signature by the publisher of the content). As a result, complete content name changes when the data associated with a given name change.

Functionally, a CCN can retain association between various names and the content which they represent. The names are hierarchical and in many situations can be understood by a user. For example, "/abcd/bob/papers/ccn/VoIP" could be the name of an article, i.e., the "VoIP" article from the "ccn" collection of papers for a user named "Bob" at the organization named "ABCD." In a CCN, there is no need for a content consumer to determine how to find the "ABCD" organization, or to find which host there holds Bob's CCN publications from an application's perspective. In one embodiment, to request a piece of content, a device in the CCN registers with the network that it is interested in that content by its name, and the content, if available in the local network, is routed back to it. The routing infrastructure takes care of intelligently propagating the interest to the prospective publishers, and then carrying any available content back along the path which the interest traversed.

CCNs have additional properties which make them especially appealing. All content can be cryptographically authenticated, meaning that some subset of nodes on the network (e.g., a legitimate querier of the content) can verify the authenticity of a piece of content. CCN also allows data to be accessed by name, independent of publisher. At the same time, one can specialize requests for data by a certain publisher. For example, one can ask for foo.txt, or "foo.txt signed by Bob." Any forms of self-verifying names can be used as a contract between producer and consumer. It is also possible to use hybrid self-verifying names, where the former components of the name are for organization and efficient routing, and the latter components of the name are self-verifying. Finally, CCN allows the separation of content and trust, enabling different data consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a Public Key Infrastructure (PKI) which that user has chosen to trust.

Embodiments of the present invention facilitate voice over CCN (VoCCN) communications with other, non-CCN-based protocols for distributing voice traffic over networks (e.g., Voice over Internet Protocol, or VoIP) through a stateless proxy server residing at the border between the CCN and a second, non-CCN network. The VoCCN proxy server can be a member of both the CCN and the second network. Note that a proxy server can be a server (a computer system) which services voice-call requests to its clients by forwarding requests to other servers. The voice-over CCN (VoCCN) solutions provided herein are more elegant and robust, and easier for an organization to maintain than conventional Voice over Internet Protocol (VoIP) solutions.

In general, a stateful proxy server is a proxy server that maintains information about the status of ongoing transactions. State information can include all stored state variables and their values. A particular set of values defines a state. A proxy server changes state whenever the values of its state variables change. A stateless proxy server is one that does not store information about the status of ongoing transactions. A stateless proxy server reacts only depending on the commands given (data received) rather than based on stored state information.

For example, VoIP requires a stateful proxy server at the border between networks. This is especially true when call security is required. To secure calls in VoIP, the incoming Session Initiation Protocol (SIP) signaling has to go through a Secure Socket Layer (SSL) enabled server in order to be trusted. Note that SIP is a signaling protocol that is widely used for setting up and tearing down multi-media communication sessions such as voice and video calls over the Internet. SIP can be used for creating, modifying, and terminating two-party (unicast) or multi-party (multicast) sessions consisting of one or several media streams. SIP can also involve changing addresses or ports, inviting more participants, and adding or deleting media streams. SSL is a cryptographic protocol that provides secure communication on the Internet including for web browsing, email, instant messaging, and other data transfers. A session is a sequence of requests that a single user issues during a particular interaction.

In one embodiment, a stateless VoIP/VoCCN proxy sits on the boundary of a VoCCN-enabled organization. It announces itself, e.g., by DNS, to the outside world as a standard SIP proxy offering VoIP access to the organization. It listens within the organization for VoCCN interests corresponding to the user agents that are willing to receive calls. If it desires, it can remember their identifiers in order to be able to detect valid incoming SIP requests from the outside. As stated above, it does not need to remember "where" the user agent is inside the organization, CCN routing will take care of returning any data packets to the requesting phone as calls come in. Remembering phone numbers at all is only an optimization to allow, for example, presence detection—incoming SIP calls for phones that are not currently expressing interest can either be rejected or automatically routed by say having a voicemail system register interest in any organizational phone number whose phone is not currently expressing its own interest.

As described in more detail below, a critical feature of the VoCCN proxy server is its statelessness—it embodies all the information it needs to know about a voice call in the CCN names it uses for the content it sends back and forth. This feature allows the VoCCN proxy server to handle any number of simultaneous voice-call sessions without excessive load, and it allows those simultaneous voice-call sessions to be transparently proxied by any number of independent gateways. In other words, a single call can move between gateways on successive packets without interruption, because there is no state information stored on one gateway unavailable to another. Note that, if a VoCCN proxy is in secure communication (e.g., through SSL) with an outside SIP server, and a call needs to migrate during SIP setup (although such migration is less likely than call migrations during the SRTP-based portion which is the call itself), the proxies do need to be able to exchange SSL state data with each other in order to let the new proxy pick up the SSL session where the other one left it off. CCN makes this possible because the second proxy is able to use the name of the SSL connection state, and express an interest in that name. In one embodiment, that interest can be anycast (accessible from anywhere) to the CCN network, and can reach whichever of those proxies has that state without having to sequentially contact them all. The new proxy will then obtain the state information sufficiently fast to continue the SSL session.

In VoIP, information can be trusted only if it goes through a single server, which must have a well-known name tied to a well-known address and must be issued a certificate that associates the name with the address. In VoIP, the SSL server has to be part of the network model in the sense that it must open a tunnel in the organizational firewall to allow a voice call to proceed after setup, and subsequently must close that tunnel when the call ends. Hence, in VoIP, the SSL server needs to retain sufficient state information and remain online for the duration of the call, not just for the call initiation, in order to be able to close that tunnel. The requirement for a single SSL server makes VoIP difficult to scale for thousands of calls.

In contrast, in some embodiments of the present invention, every packet in a CCN is signed. Consequently, the system does not need to maintain state information associated with the voice call and can shift between different servers depending on traffic. Thus, in embodiments of the present invention, integrity and trust are properties of the data and not of the channel through which data is transported. The system also does not have to maintain a firewall because it only routes calls to a particular user or device if it has received from that user or device packets indicating interests in the subsequent packets of each call directed to that user or device. Each such interest tells the VoCCN proxy that it should allow the corresponding next voice packet through the firewall. When that call is terminated, the user's phone will cease expressing interests in its next packet, which will automatically allow the VoCCN proxy to stop forwarding packets, without having to actively monitor the status of the call. In short, users communicate an interest to the proxy server, so that the proxy server can do more work on behalf of the user.

In a CCN, the CCN packet can encapsulate the SIP messages. After receiving and forwarding a call initiation request from a second, non-CCN network, the VoCCN proxy server can send a response packet from the callee back to the second network as a normal VoIP packet by translating packets between the IP format and CCN packet format. In one embodiment, the VoCCN proxy server can sign the packet prior to sending it onto the CCN, so that the callee can have pre-authenticated data. This feature can prevent unsolicited data being blindly forwarded to a CCN user.

Figure 1A:
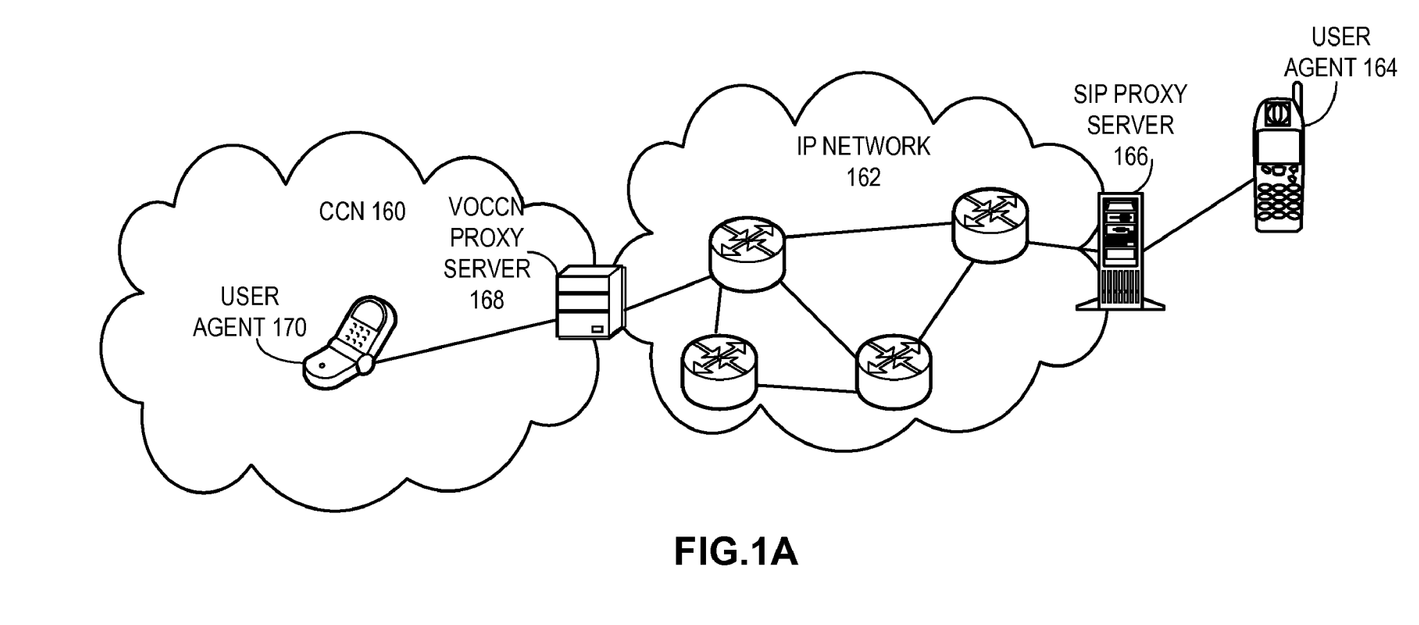
FIG. 1A illustrates the operation of a VoCCN proxy server, in accordance with an embodiment of the present invention.

FIG. 1A illustrates the operation of a VoCCN proxy server, in accordance with an embodiment of the present invention. In this example, a VoCCN proxy server 168 resides at the border of a CCN 160. VoCCN proxy server 168 is in communication with a user agent 170 and is dual-homed with an IP network 162. Within the IP network 162 is a conventional SIP proxy server 166, which is in communication with a user agent 164.

During operation, to receive inbound calls, user agent 170 expresses an "interest" in data traffic of voice calls directed to user agent 170. Assume that user agent 170 receives a first packet of a call initiated by user agent 164 and forwarded by SIP proxy server 166. Based on the content of this first packet, user agent 170 identifies a first name for that call, which in one embodiment is set by the caller user agent 164. It is assumed that VoCCN proxy server, on behalf of the caller user agent 164, has expressed an interest in anything addressed to this first name. In other words, the first name is the identifier for user agent 164 with respect to the current voice-call session.

The callee, user agent 170, then responds with a data packet (which is the callee's first packet for the call) addressed to the first name, and sets a second name which can be used by VoCCN proxy server 168 on behalf of user agent 164 to identify this call. Meanwhile, user agent 170 registers an interest in any data addressed to the second name.

For outbound calls, i.e., calls initiated from within CCN 160 and directed to outside networks, VoCCN proxy server 168 first expresses an interest in a content name space (e.g., a name prefix) that corresponds to voice calls to outside destinations, such as VoIP destinations or PSTN telephone numbers. In one embodiment, when user agent 170 initiates a voice call to user agent 164, user agent 170 first sends a SIP initiation packet encapsulated in a CCN format. User 170 also expresses an interest in receiving messages from the intended callee, user agent 164. In one embodiment, user agent 170 can specify a name that VoCCN proxy server 168 can use when forwarding messages from user agent 164.

The CCN-encapsulated SIP initiation packet from user agent 170 is received by VoCCN proxy server 168. VoCCN proxy server 168 then removes the CCN encapsulation and forwards the SIP initiation packet to SIP proxy server 166, which subsequently forwards the packet to user agent 164. In response, user agent 164 returns SIP messages to complete the session initiation process. When these messages arrive at the border between CCN 160 and IP network 162, VoCCN proxy server 168 encapsulates them in CCN format with the name previously specified by user agent 170, or, ideally, the name derivable from the SIP messages themselves so that the VoCCN proxy can remain stateless. Since user agent 170 has expressed an interest in content associated with this name, these SIP messages can be successfully received by user agent 170. The aforementioned CCN-to-SIP translation process establishes the initial hand-shake between user agent 170 and user agent 164. The subsequent session initiation process can be performed using, for example, the SIP session initiation process.

Figure 1B:
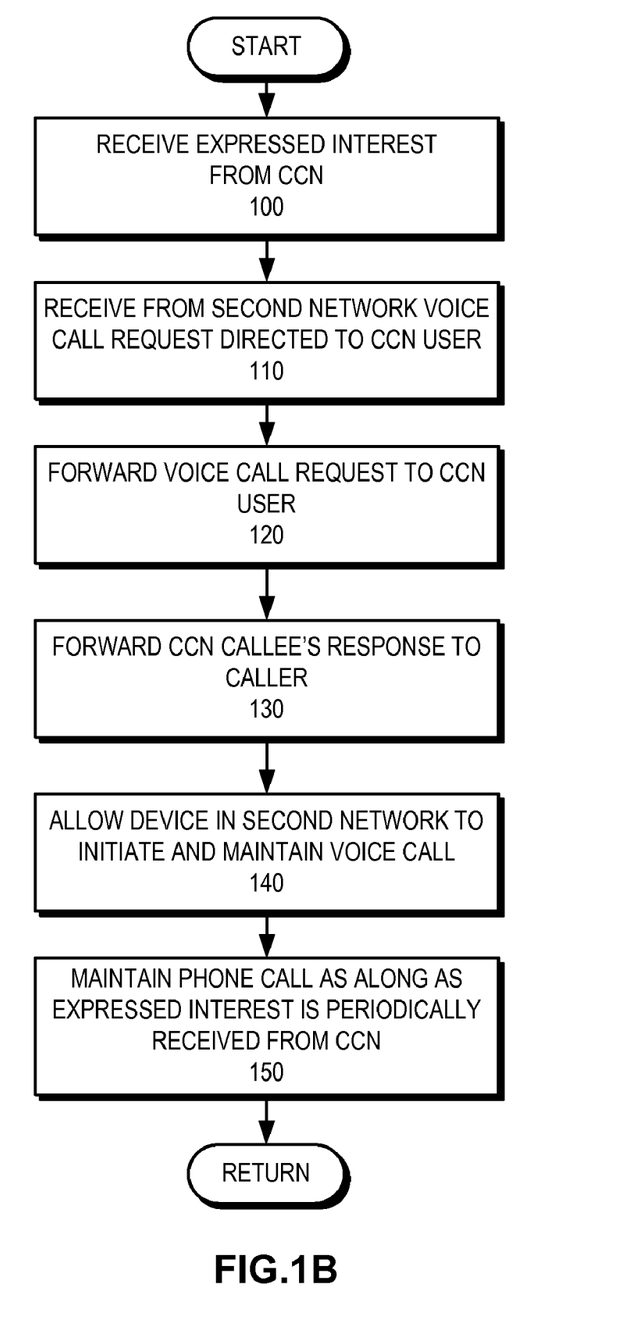
FIG. 1B presents a flowchart illustrating an exemplary process of accommodating inbound voice calls from a non-CCN network to a CCN, in accordance with an embodiment of the present invention.

FIG. 1B presents a flowchart illustrating an exemplary process of accommodating inbound voice calls from a non-CCN network to a CCN, in accordance with an embodiment of the present invention. During operation, a VoCCN proxy server receives from the CCN an expressed interest in receiving voice calls directed to a CCN user (operation 100). The expressed interest is a way for the CCN user to tell any CCN entity (which can be a router, gateway, proxy server, or any peer in the same CCN network) that the CCN user is interested in receiving calls.

Next, the VoCCN proxy server receives from a second network an initial request for a voice call directed to the CCN user (operation 110). The VoCCN proxy server then forwards this request to the CCN user (operation 120). In one embodiment, the request contains a name for the call, so that the CCN user who is the callee can express an interest in content associated with this name for future communication of the voice call. Subsequently, the CCN user responds. The VoCCN proxy server then transmits the callee's response to the second network (operation 130). Note that various naming methods can be used to represent the identifier associated with the voice call including structured names such as a left-oriented prefix major method (e.g., /parc/home/smetters is a "parent" of /parc/home/smeters/test.txt).

Subsequently, the VoCCN proxy server allows the caller in the second network to initiate and maintain the voice call directed to the CCN user based on the identifier associated with the CCN user and the identifier associated with the voice call from the second network, without maintaining state information associated with the voice call (operation 140).

The phone call is maintained as long as an expressed interest in continuing the phone call is periodically received from the CCN user who is the callee (operation 150). The particular period can vary as suited to the particular type of call. If this expressed interest is not periodically received, the call is automatically terminated.

Figure 1C:
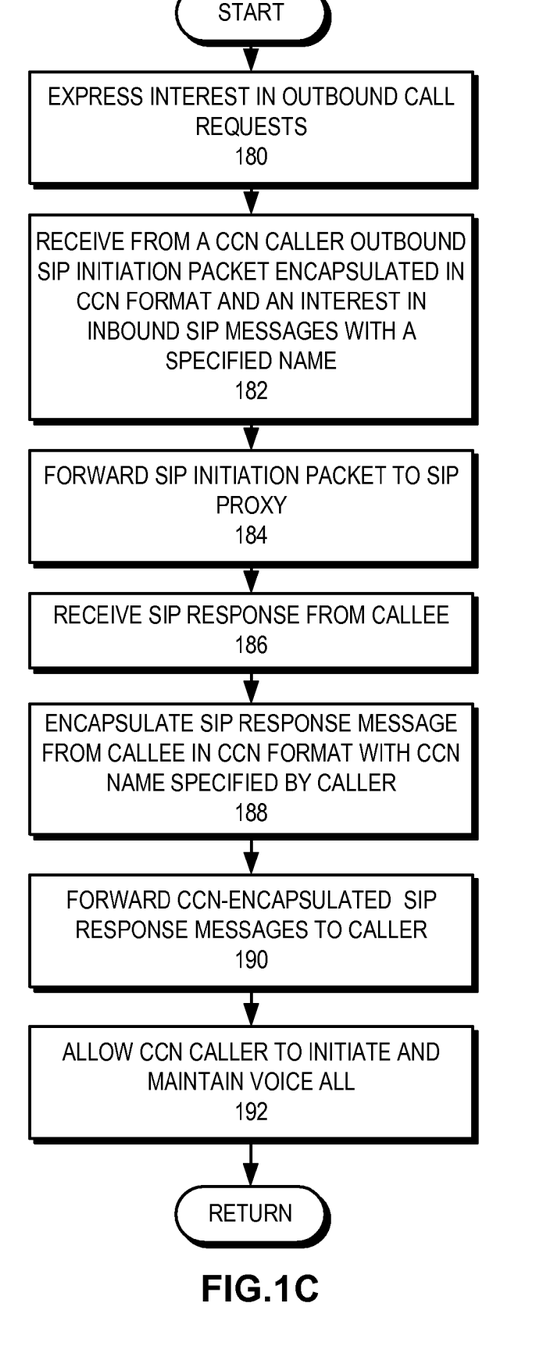
FIG. 1C presents a flowchart illustrating an exemplary process of accommodating outbound voice calls from a CCN to a non-CCN network, in accordance with an embodiment of the present invention.

FIG. 1C presents a flowchart illustrating an exemplary process of accommodating outbound voice calls from a CCN to a non-CCN network, in accordance with an embodiment of the present invention. During operation, the VoCCN proxy server first expresses an interest in receiving outbound call requests (operation 180). When a CCN user wishes to make a voice call, the VoCCN receives from this CCN caller an outbound SIP initiation packet encapsulated in CCN format (operation 182). In one embodiment, the VoCCN proxy server also receives from the CCN caller an interest in inbound SIP messages with a specified name. That is, the CCN caller can optionally specify what name the VoCCN proxy server can use when forwarding SIP messages from the callee.

Next, the VoCCN proxy server forwards the SIP initiation packet to a SIP proxy (operation 184). In response, the VoCCN proxy server receives the SIP response from the callee (operation 186). The VoCCN then encapsulates the SIP response messages in CCN format with the CCN name specified by the caller (operation 188). The CCN-encapsulated SIP response messages are then forwarded to the CCN caller (operation 190). Subsequently, the VoCCN proxy allows the CCN caller to initiate and maintain a voice call (operation 192). Note that in one embodiment, when the CCN caller stops expressing interests in receiving content corresponding to a particular call, the call is automatically terminated.

Note that in the CCN information can be addressed, located, and disseminated by its content identifier (also referred to as names) and data packets are self-authenticating. The CCN determines how to route information based on the content identifier. Self-authentication means that every data packet contains its own authentication: each data packet is digitally signed by someone trusted by the consumer so that it can be cached, replicated, and obtained from anyone and its integrity and authenticity confirmed. Specifically, CCNs authenticate name-data associations. For example, what a publisher "says" when they insert content into a CCN is "N is my name for content C." A content publisher can digitally sign the mapping from the name N the content C. The complete name of a piece of CCN content is the name along with the signature on that name and content along with a certain amount of additional authentication metadata (e.g., an identifier of the publisher, such as the cryptographic digest of his public key, a timestamp, and a representation of the type of the content).

Content Flow Through a CCN

Figure 2:
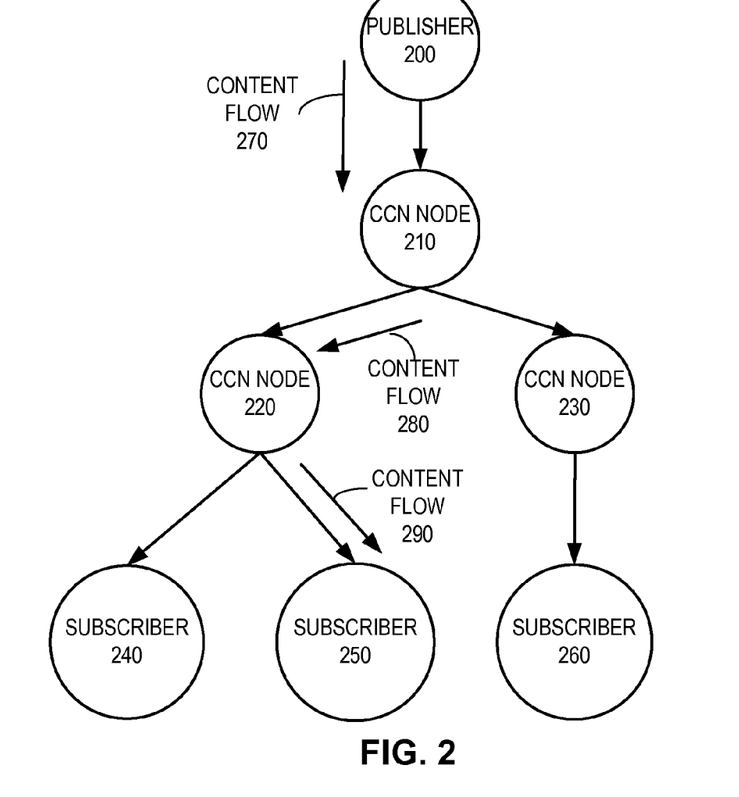
FIG. 2 illustrates an exemplary process for content flow through a content centric network, in accordance with an embodiment of the present invention.

FIG. 2 illustrates an exemplary process for content flow through a CCN, in accordance with an embodiment of the present invention. In this example, content flows from a Publisher 200 to a Subscriber 250 via CCN Nodes 210, and 220. The flow is represented by Content Flows 270, 280, and 290. In a CCN, any number of intermediate nodes (CCN Nodes 210, 220, and 230) in the network graph between Publisher 200 and Subscriber 250 can participate in caching local copies of the data as it travels across the network. This property reduces the network load for a second subscriber located in proximity to other subscribers by implicitly sharing access to the locally cached content. In FIG. 2, if Subscriber 240 were to request the same content as Subscriber 250, the locally cached copy stored on CCN Node 220 can satisfy the request without traversing the entire data path all the way back to Publisher 200. Similar, if subscriber 260 expresses an interest in the same content, CCN Node 230 or 210 can provide a cached copy of the content. In some embodiments, a voice call can make similar use of cached local copies and content flow. These features can be useful in a multicast voice session, such as a conference call. This architecture also facilitates user mobility. For example, subscriber 250 may migrate and become coupled with CCN node 230. Furthermore, the architecture can provide failure or fault tolerance when a subscriber can be in communication with multiple nodes.

SIP Signaling

SIP is defined independent of the underlying transport mechanism, except to state differing behavior for stream-based reliable connections like TCP vs datagram connections like UDP. The SIP RFC also explains how to maintain hop-by-hop accounting of the path a SIP message takes across various proxies from an initiator to its eventual target. In the case of CCN, the best match for SIP would be a datagram model. Since a SIP interaction is made of easily separable request and response protocol data units (PDUs), these PDUs can be mapped into content.

In the traditional SIP model, the caller's user agent opens a connection to the configured SIP proxy and entrusts the task of delivery to this proxy. In some embodiments of the present invention, a VoCCN proxy names the SIP content using a CCN naming convention so that any CCN recipient that has expressed interest in an invitation will receive it. For example, the content name for the SIP INVITE in FIG. 3 might be named "/abcd.com/bob/sip/invite" to indicate that this SIP INVITE content is intended for a user named "Bob" at an organization named ABCD. This content will be delivered everywhere on the CCN where interest for this content exists. This removes the location limitation which is inherent in VoIP applications by deriving a consistent CCN naming convention for SIP addresses. In this example, a SIP invitation needs only to contain the callee entity (the name and organizational affiliation of the callee), the protocol identifier ("SIP") and the SIP method ("INVITE"). It is not necessary for the caller to know where the callee is on the CCN, or who to ask in order to find them—the CCN network is responsible for delivering the content.

In one embodiment, the VoCCN proxy can, on behalf of the non-CCN user, express an interest for the content name associated with the same voice call. The CCN callee can derive from the SIP INVITE content forwarded by the VoCCN proxy a name to use for content related to this SIP conversation. In addition to the entity, protocol, and method, the VoCCN proxy can add a call identifier to the SIP INVITE in order to disambiguate multiple signaling instances. This way, content is delivered only to those instances actively participating in the signaling. In our ongoing example, with reference to FIG. 1A, in response to the invite in FIG. 3, the subsequent voice-call content from user agent 170 might have the name "/efgh.com/alice/sip/response/12345600@efgh.com."

Figure 3:
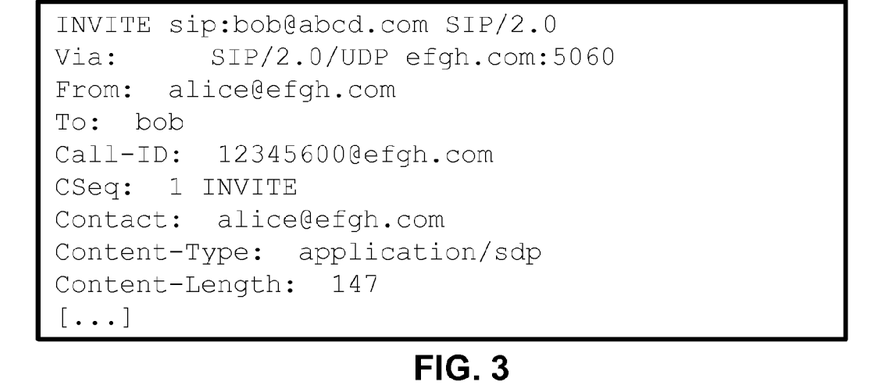
FIG. 3 illustrates an exemplary Session Initiation Protocol (SIP) message.

Note that to keep the VoCCN proxy stateless, the inbound and outbound messages ideally carry the necessary state information to reach the other side. In one embodiment, this can be achieved by including state information in the CCN names. In other cases, the state information can also be added to the payload data. In general, there are at least three approaches to carry state information with the messages: (1) including state information in the CCN name, (2) including state information in the SIP message itself, and (3) including state information in the CCN data message. Referring to FIG. 3, the state-information can be included when the VoCCN proxy names the first INVITE as "/abcd.com/bob/sip/invite/ 13.1.14.5/2303" instead of "/abcd.com/bob/sip/invite" so that the CCN callee can name the response as "/efgh.com/ alice/sip/response/12345600@efgh.com/13.1.14.5/2303."

When the VoCCN proxy receives this response, it can derive from the CCN name the VoIP destination address to which the response is to be forwarded. This way, the VoCCN proxy does not need to maintain any state information about the call. In most cases this is a small overhead and encoding in the names is appropriate. Other possible cases, such as different ways of handling SSL, could involve more state information, in the name or other portions of the data.

Pattern of Communication

Figure 4:
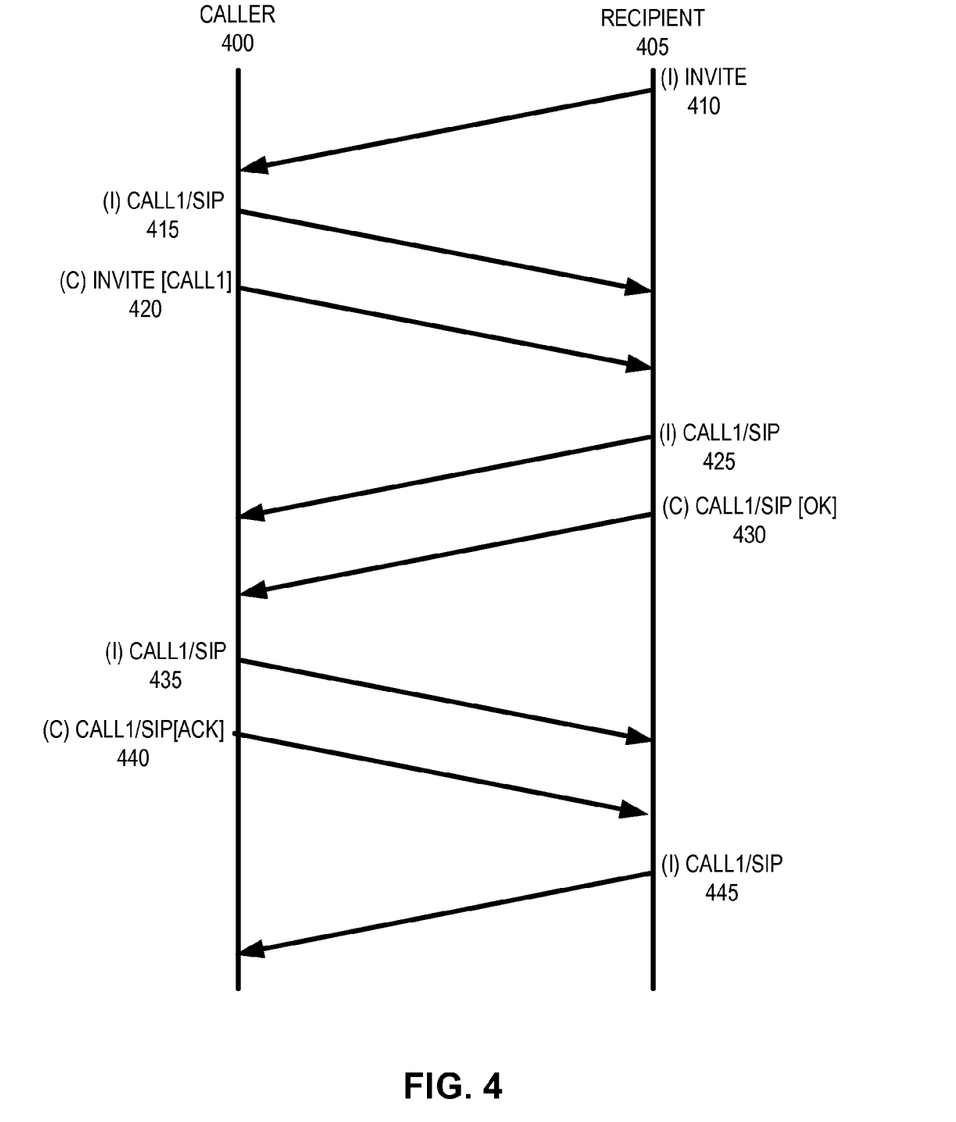
FIG. 4 illustrates an exemplary process of content following interest during SIP signaling on a CCN, in accordance with an embodiment of the present invention.

Before sending content for which a response is expected, the sender can also express an interest in the response. The name given to the response content can be implicit given the content of the request so it is possible to calculate the name (or a prefix of the name) ahead of time. This lock-step transaction creates a flow-control for CCN traffic: content is delivered only if it is asked for. In short, content follows interest. FIG. 4 illustrates an exemplary process of content following interest during SIP signaling between a Caller 400 and a Recipient 405, in accordance with an embodiment of the present invention. The arrows represent the flow and direction of content and interest. Content is prefixed with a "(C)" in the figure and Interest is prefixed with an "(I)" in the figure. Recipient 405 issues an Invite interest 410, which in one embodiment corresponds to recipient 405's desire to receive calls. Caller 400 issues an interest in response from Recipient 405 through Call1/SIP 415 and content through Invite[Call1] 420 to recipient 405. Recipient 405 expresses an interest in receiving Call1/SIP 425 and sends content Call1/SIP [OK] 430. Caller 400 responds with continued interest Call1/SIP 435 and content Call1/SIP [ACK]. Recipient 405 shows continued interest in the call by Call1/SIP445. This process continues for as long as caller 400 and recipient 405 wish to keep the call alive. As a result, there is no need for the VoCCN proxy server to maintain state information about the call. Note that the above description describes the general pattern for carrying point-to-point conversations over CCN CCN Support Functions The CCN can support a number of functions for embodiments of this invention. First, the eventual call recipient's interest in a SIP INVITE can either flood the network or at least be distributed in such a manner that content directed to this interest can be routed to a point where it can meet this interest. Second, the CCN can maintain the potential recipient's interest in a SIP INVITE. Since a potential call recipient can wait indefinitely for a phone call, either the network or the device itself can maintain continued interest as long as the device is still interested in participating in a conversation. In some embodiments of the present invention, a voice call is maintained as long as an expressed interest in continuing the phone call is periodically received from the CCN. Interests can expire at a reasonably aggressive period (some small number of seconds), so that a device that is either turned off or taken offline will essentially prune its interest from the network.

RTP Data

When the SIP signaling process succeeds, various parameters can be exchanged to define the media streams to be opened. The media streams are defined in payloads contained within the SIP packets. Session Description Protocol (SDP) is a common payload type for specifying such session information in SIP, and the Real-time Transport Protocol (RTP) is a common method for transporting the actual real-time data contained in the audiovisual session.

In some embodiments of the present invention, the system maps RTP to CCN to facilitate voice over CCN. Individual RTP frames in the same stream can be distinguished from their neighbors using the sequence number. This piece of information, paired with the entity of the destination party and the call ID from the SIP session, names the content in such a way that the RTP stream can be reconstructed by the recipient. For example, suppose that the content name is "/abcd/bob/rtp/12345600@efgh.com/5678", where the last component of the name is the sequence number. This naming method allows multiple RTP frames to be temporarily stored in the network to account for latency between the sender and receiver.

Since content by a given name replaces any previous content by that same name, the system can cache only one copy of each frame corresponding to a sequence number. The sequence number is not globally unique in an RTP stream, since it is only a 16 bit integer, however it is unreasonable to expect a packet that is 2^16 frames old to be any use to the recipient. If storing this much data in the network became useful, using the extended sequence number as calculated in the RTP RFC suffices. In much the same way as signaling interest and content flow in lock-step, RTP interest and content also precede each other in lock-step. However, in a disperse or high-latency network, the round-trip latency can easily be large enough to delay reception times of media packets to the point where they become unplayable.

Figure 5:
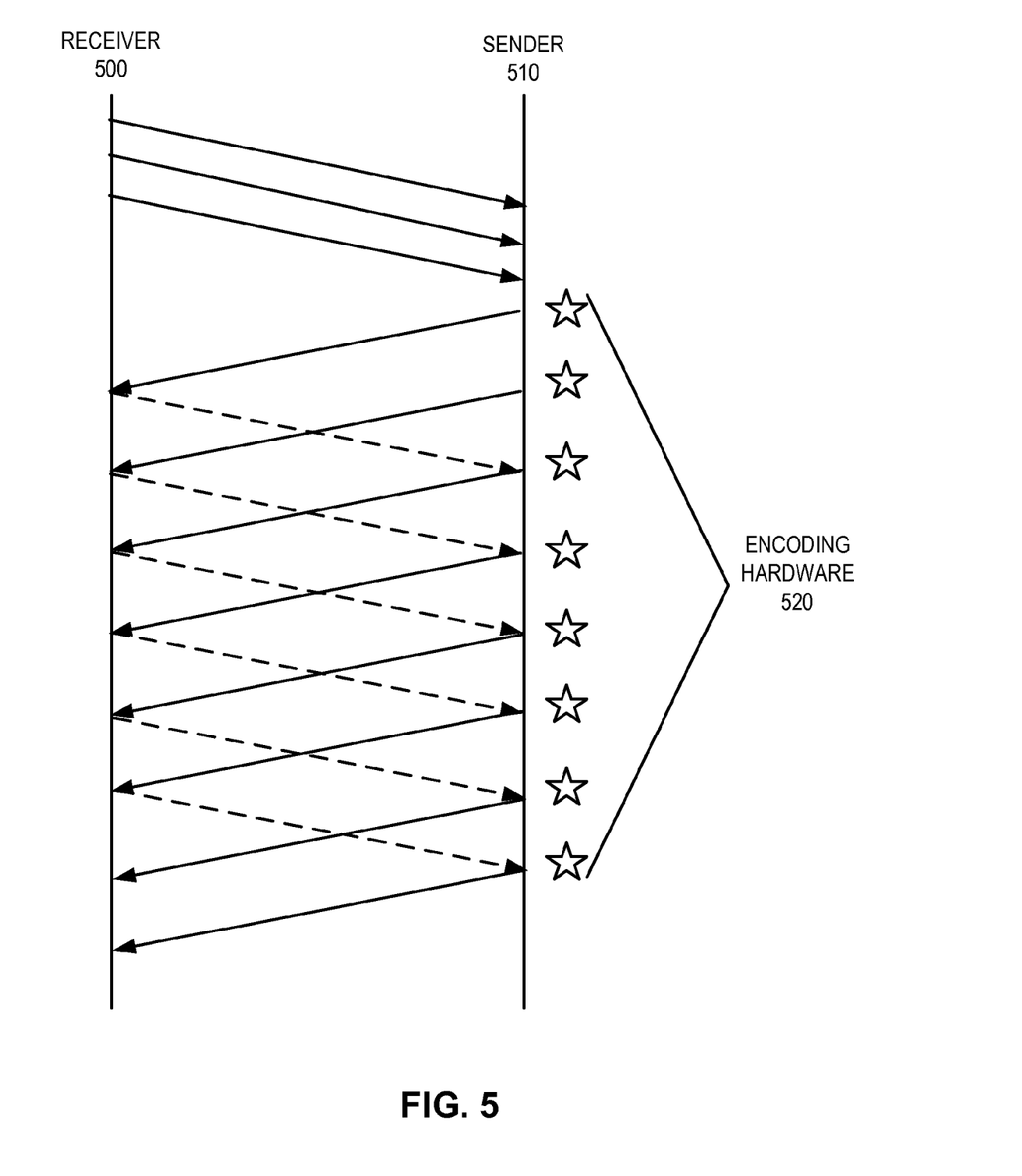
FIG. 5 illustrates an exemplary process of content following pipelined interest during a SIP media stream on a CCN.

To solve this problem, the system can support multiple pipelined interests in the channel at the same time. FIG. 5 illustrates an exemplary process of content following pipelined interest during a SIP media stream on a CCN. A Receiver 500 expresses interest in receiving calls. A Sender 510 then initiates a call. The CCN delivers content as data arrives for delivery from Encoding Hardware 520 instead of the rate at which interest arrives from Receiver.

In one embodiment, a CCN media receiver can maintain some number of outstanding interests in a media stream. When the stream is opened (or as network conditions change), the CCN generates a number of interests in the same content. Each time the system receives content for that stream, it produces a new interest, thereby restoring the number of outstanding interests to that required by the pipeline. As a result, a CCN can maintain multiple interests for the same content. The system can coalesce these interests into an interest and a count. In contrast, only one copy of content by a given name is retained at a time. As the content propagates backward towards the interest it decrements the counts. This way, the rate at which content arrives can be determined by the publisher (e.g., the data rate of the media codec) up to the limit set by the pipelined interest of the subscriber.

Securing Communication

One can use the standard end-to-end security provided by Multimedia Internet KEYing (MIKEY) to exchange keys and encrypt the media path containing the voice traffic, all within the standard VoIP packets (using the secure RTP protocol). However, one must be able to solve the problem in MIKEY of authenticating the public key of the contacted party. One must also be able to authenticate the encapsulated packets to conform to the CCN requirement that all packets must be publicly authenticatable. Secure Real-time Transport Protocol (SRTP) uses symmetric-key based encryption and authentication to protect individual packets in the media stream. This means that the endpoints of the call can authenticate each SRTP packet, and no one else can forge those packets.

In one embodiment, a VoCCN proxy server can look up public keys for any registered "phone" in the organization, which it can then provide via a standard directory protocol (e.g., LDAP) to interested parties on the outside. Although this poses some organizational privacy risk, it does provide a single-point-configuration solution to the key distribution problem for VoIP. Phones are configured with access to their private keys, which allows them to express interest in calls intended for them, and which they publish via the CCN. The VoIP gateway both hears those interests and is able to use the CCN to look up the public key of the target node (and also to verify the authenticity of the signature on the interest, if one is required to control spread of voice call data). This allows the proxy to respond to LDAP requests for public keys for end-entity phones within the organization, without having to be statically configured to do so.

The VoCCN proxy can also serve as an authentication proxy to solve the problem of authenticating legacy VoIP packets to the CCN infrastructure. As noted above, each CCN data packet is ideally publicly verifiable (e.g., with a digital signature), while secured VoIP packets are only verifiable by the endpoints in a VoIP call. The VoCCN proxy, which is trusted by other CCN nodes in its organization, can sign encapsulated VoIP packets when they are inserted into the CCN. It could use standard digital signatures to do so, or any other form of publicly-verifiable stream-signing to amortize the cost of single digital signatures over multiple stream packets, possibly at the cost of only being able to verify those packets at some time after they are originally generated (e.g., the VoCCN proxy would gather information about 100 packets in the voice call, and then emit a single signature that allows all those 100 packets to be authenticated). However, to do so would likely violate the statelessness of the VoCCN proxy and require the verifier to also keep significant state. Such a mechanism could take advantage of any existing or future developments in the cryptographic literature that allow for more efficient mechanisms for signing digital streams.

Figure 7:
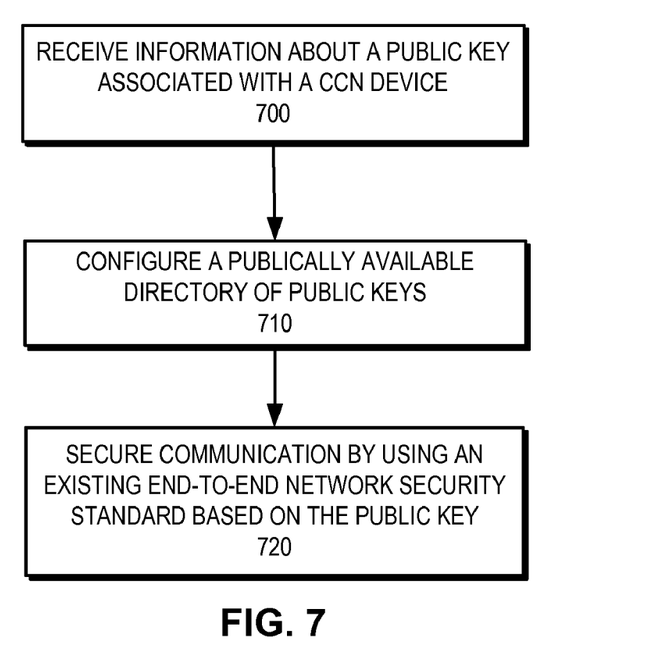
FIG. 7 presents flowchart illustrating the process of managing public keys, in accordance with an embodiment of the present invention.

FIG. 7 presents flowchart illustrating the process of managing public keys, in accordance with an embodiment of the present invention. During operation, a VoCCN proxy server receives information about a public key associated with a CCN device (operation 700). The VoCCN proxy server then configures a publicly available directory of public keys (operation 710). By doing so, the VoCCN allows endpoints to discover those keys and secures communication by using an existing end-to-end network security standard based on the public key (operation 720).

Single-Point Configuration for VoCCN

One of the advantages of VoCCN is that it lowers the total cost of ownership (TCO) of a VoIP solution by enabling single-point configuration. As in the example of the auto-configured public-key directory and presence information above, in a VoCCN system, a phone merely needs to be configured with its identity information ("This is Bob's phone"). The configuration of the remainder of the system automatically follows. "Bob's phone" is given or generates for itself a public-private key pair, which it then publishes via CCN and has certified by its host organization (this can happen as part of configuring the phone, or in a lower-security but easier-to-use fashion by certifying the first key that shows up claiming to belong to "Bob's phone" and waiting for user Bob to complain if he cannot receive his phone calls because an attacker has hijacked his phone's identify).

Calls are then automatically routed to the phone by the CCN infrastructure—wherever the phone is, it starts expressing interests in its calls, and those calls follow the interest to the phone. This way, the network infrastructure does not need to be configured to know what port the phone is plugged into. Furthermore, presence information can be determined by whether the phone is expressing interest. If the phone is a desk phone, it might always be available, and can collect voicemail on the user's behalf. If the phone is instead a piece of software and configuration residing in a user's mobile phone, the organization might have infrastructure that either forwards calls to that phone when the user is not available or collects voicemail for the user when it notices the phone is unavailable.

In some embodiments, the aforementioned features require configuration only in a single point—the phone is given an identity, after which the phone can make calls securely. Policy about the phone and additional services provided on the behalf of all phones can be all configured at the points at which those services are provided. This single-point configuration can significantly reduce configuration errors and thus lower the cost of implementing the VoCCN system.

Tracking the Status of CCN Users and Forwarding Calls

Figures 8, 9:
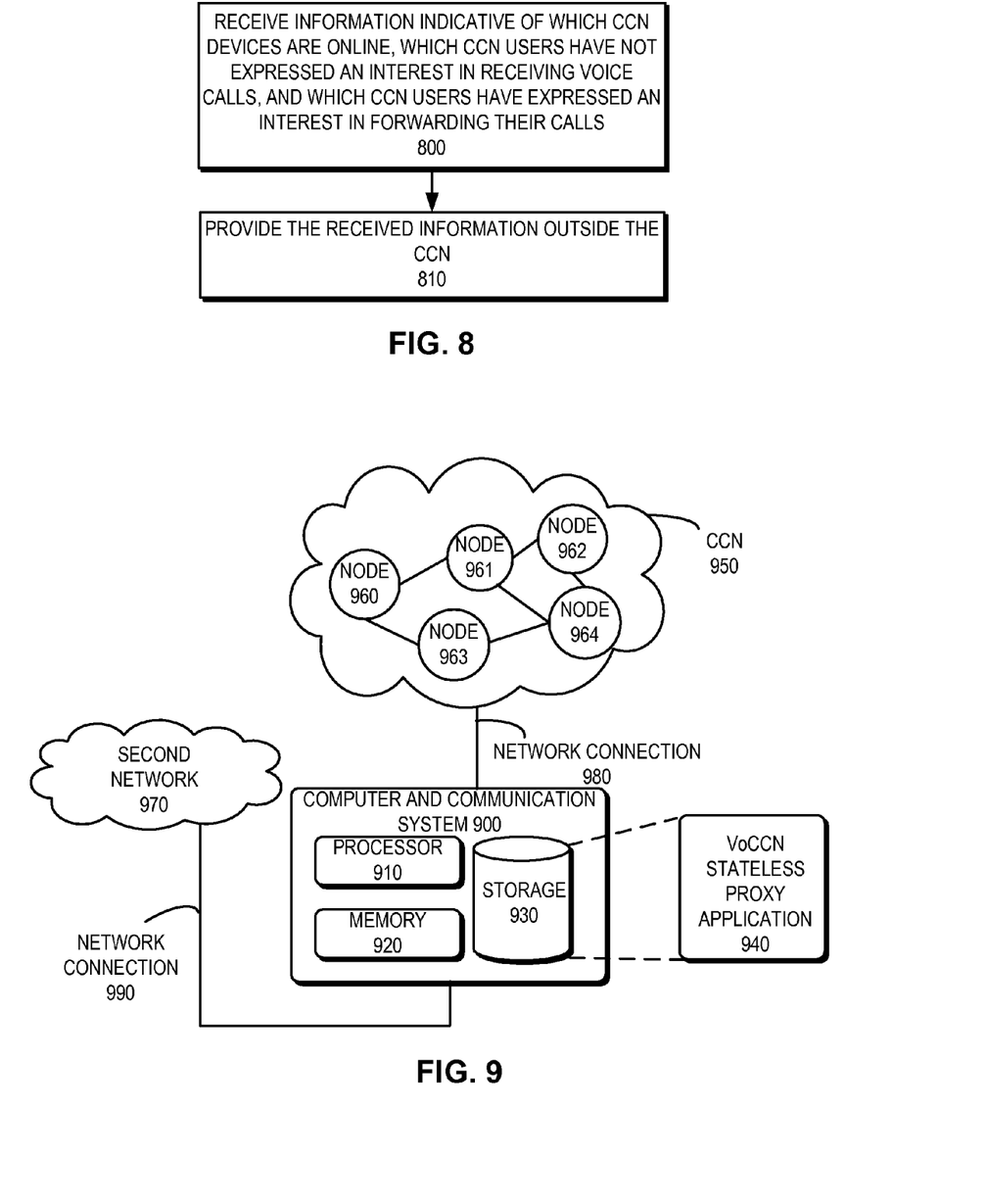
FIG. 8 presents an exemplary process of receiving information indicative of which CCN devices are online, which CCN users have not expressed an interest in receiving voice calls, and which CCN users have expressed an interest in forwarding their calls, and providing the received information outside of the CCN.
FIG. 9 presents an exemplary computer system for facilitating voice over a CCN.

FIG. 8 presents an exemplary process of receiving information indicative of which CCN devices are online, which CCN users have not expressed an interest in receiving voice calls, and which CCN users have expressed an interest in forwarding their calls (process 800), and providing the received information outside of the CCN (process 810). For example, the received information might be used to route a caller to voice mail or to a phone outside of the CCN.

CCN Wire Protocol

In some embodiments of the present invention, the system uses a wire protocol that is based on XML, such as Fastinfoset. Various other formats can be used to perform compression in such a way that it takes into account the structure of an XML document (e.g., XML end tags need not be encoded explicitly, but instead all fields are tagged with their length), and encodes binary content without resorting to base64 in its encoded content.

Figure 6:
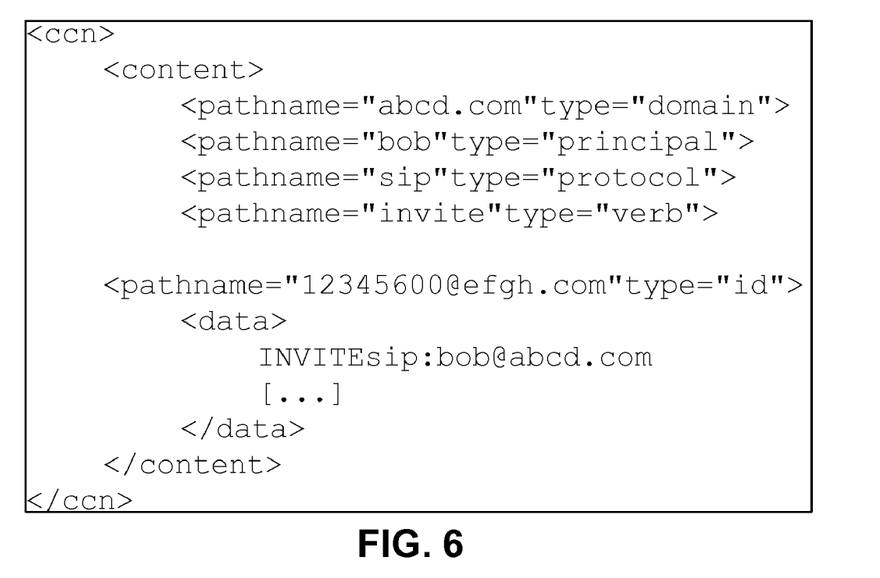
FIG. 6 illustrates an exemplary CCN message in XML notation.

Although we will use XML terms to describe the wire protocol, from an implementation standpoint data encoded in FastInfoset or other compression format need not be converted to XML in order to be used. A CCN protocol data unit includes a non-zero chain of <ccn> elements. Each <ccn> element can contain any number of <interest> or <content> elements inside. This property can be used to perform aggregation or fragmentation at any point in the network, by adding or removing these elements from the <ccn> element. From a networking stand-point, each <interest> or <content> element need not be treated differently based on whether they appear in the same frame. Both <interest> and <content> tags contain an ordered list of path elements in the same order as the notation used elsewhere in this disclosure. For example, FIG. 6 illustrates an exemplary CCN message in XML notation, specifically in relation to sending the INVITE content in FIG. 3. In this manner, the system can pull salient information for the purposes of routing the content around a CCN to the networking layer.

In some embodiments of the present invention, the system preserves the application PDUs. This means that both signaling and data frames (the SIP and RTP content) are encapsulated in total. As a result, in the CCN frame, a small amount of information necessary for routing is a duplicate of information available deeper in the content.

Agents

In one embodiment, a CCN manages the flow of control with a CCN agent. All of the applications and the network interfaces on a given CCN node can communicate via a single CCN agent process. In some embodiments of the present invention, the CCN agent is a separate process that communicates with applications by means of UNIX-domain sockets. The CCN agent can be single-threaded and organized around a select loop that waits for data from any of the connected sockets. The connections to networks are accomplished by separate processes, each of which connects to the CCN agent in the same way as applications do and forwards the packets in both directions. This function can be incorporated into the agent itself for a small gain in efficiency.

The CCN agent keeps a content cache and a table of outstanding interests (counted on a per-interface basis). When a packet arrives, the CCN agent dissects it into its constituent interests and content items, and each of these is processed independently. For content, the CCN agent first consults the content cache to see if an item with the same full name is already there. If it is, the content is discarded as a duplicate. Note that this does assume that the name uniquely identifies the content.

Next, the CCN agent checks the pending interest table to see if it is a match for any of the pending interests. The content is deemed to match an interest if the interest's name is a prefix of the content item's name. When such a match is found, the CCN agent consumes the interest (i.e., the per-interface count is decremented), and schedules the content to be sent to the relevant interfaces. In any case, the CCN agent inserts the new content into the content cache.

The treatment of arriving interest is somewhat more involved than the treatment of content. The CCN agent consults the content cache to find out whether there is already a content item there that can satisfy the interest (using the prefix-matching criterion), and that has not already been sent out or received on the interface by which the interest arrived. If such a content item is found, the CCN agent schedules it to be sent, and consumes the interest.

There can be multiple cached content items that match the interest; in this case only one of these is sent. For correctness, it does not matter which one is sent. In some embodiments of the present invention, the CCN agent can send the earliest arrivals first. If the CCN agent is not able to satisfy the interest out of the content cache, it becomes a pending interest associated with the interface it arrived on, and is propagated to other interfaces.

In some embodiments, the CCN agent uses a flooding model for the propagating interests. To avoid loops, the CCN agent attaches a randomly-generated identifier to each propagating interest that does not already have one, and discards on arrival any interest that has an identifier that has been seen before (subject to an appropriate time window to keep the size of the identifier table bounded). The CCN agent sends the propagating interests with a small randomized delay. It may happen that new content which matches some of these propagating interests arrives before they have been sent out. When this happens, the propagation is cancelled as the interest is consumed, but the CCN does not attempt to withdraw interest that has already been sent out. Interests that do not get consumed time out after a suitable delay.

In some embodiments of the present invention, the interest timeout mechanism uses a model of exponential decay in which pending interests are discarded at a rate that is proportional to the number that are pending. The effect is that after a time interval of one half-life period has elapsed, half of the pending interests will have decayed. This is altered when there is only one pending interest remaining to ensure that the last interest persists for the entire half-life period. Specifically, the interest counts, stored with a scale factor of five, are updated four times per half-life period with the formula:

$$\text{if } x<=5 \text{ then } x=x-1;$$

$$\text{else } x=\text{floor}((x*5+3)/6);$$

where 5/6 stands as a convenient rational approximation for $2^{(-1/4)}$. The applications, which are responsible for refreshing the decayed interest, use a similar exponential decay model to decide when refreshing is needed. Note that there are several places where time-based actions are required. Foremost among these are interest propagation and pending interest decay. Time-based pruning of the content cache may also be desired, as well as retirement of the data structures for interests that have been inactive for a long time. To accomplish this, the CCN agent contains a scheduled action list, analogous to the callout facilities in operating system kernels. The timeout value for the CCN agent's select loop is calculated according to the time of the next scheduled action.

Computer and Communication System

FIG. 9 presents an exemplary computer system for facilitating voice calls over a CCN in accordance with an embodiment of the present invention. In FIG. 9, a computer and communication system 900 includes a processor 910, a memory 920, and a storage device 930. Storage device 930 stores programs to be executed by processor 910. Specifically, storage device 930 stores a program 940 that implements a VoCCN proxy for facilitating voice calls over a CCN 950. FIG. 9 also shows the context of exemplary computer system: it sits between a CCN 950 and a second network 970 with respective network connections 980 and 990. The network connections can be broadband, wireless, telephonic, satellite—or any type of network connection. CCN includes multiple nodes 960-964. These nodes are computer systems that comprise network CCN as well as end-points representing users and devices. Computer and communication system 900 can be part of either or both of CCN 950 and second network 970. During operation, VoCCN stateless proxy application 940 is loaded from storage 930 into memory 920 and executed by processor 910. As a result, computer and communication system 900 serves as a VoCCN proxy server that resides on the border between CCN 950 and second network 970, and performs the functions described above.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for facilitating voice calls over a content centric network (CCN), comprising:
receiving, by a computer, from a CCN user a CCN packet containing an expressed interest in receiving voice calls directed to the CCN user, wherein the CCN packet can be addressed, located, and disseminated by a unique and persistent CCN name, wherein the CCN name contains authentication information, and wherein the CCN packet can be self-authenticated using the authentication information;
receiving from a second network a packet for a voice call directed to the CCN user, wherein the second network is not a CCN;
forwarding to the CCN user the packet received from the second network with a CCN name corresponding to the interest expressed by the CCN user after translating the received packet to a CCN packet format;
forwarding a second CCN packet from the CCN user for the voice call to the second network after translating the second CCN packet to a non-CCN packet format;
allowing a device in the second network to initiate and maintain the voice call directed to the CCN user based on a CCN name associated with the voice call, without maintaining state information associated with the voice call; and
allowing the voice call to be terminated when no interest message corresponding to the voice call is received from the CCN user for a predetermined period.

2. The method of claim 1, further comprising:
expressing an interest in receiving outbound voice call requests from one or more CCN callers;
receiving an outbound voice call request from a CCN caller;
receiving an interest expressed by the CCN caller in receiving packets associated with the outbound voice call;
forwarding the outbound voice call request to a second network, wherein the second network is not a CCN;
in response, receiving a packet associated with the outbound voice call from the second network;
forwarding the packet associated with the outbound voice call to the CCN caller using a CCN name associated with the interest expressed by the CCN caller after translating the packet to a CCN packet format;
allowing the CCN caller to initiate and maintain the outbound voice call; and
allowing the outbound voice call to be terminated when no interest message corresponding to the outbound voice call is received from the CCN caller for a predetermined period.

3. The method of claim 1, further comprising terminating the voice call after receiving from the CCN an expressed interest in not receiving voice calls directed to the CCN user.

4. The method of claim 1, further comprising sharing the load of facilitating voice calls to the CCN among a number of proxy servers, wherein a respective proxy server does not maintain state information associated with a voice call.

5. The method of claim 1, further comprising digitally signing a respective CCN packet associated with the voice call such that the CCN packet can be verified by one or more nodes in the CCN.

6. The method of claim 1, further comprising:
receiving information about a public key associated with a CCN device;
configuring a publicly available directory of public keys, thereby allowing second network endpoints to discover those keys; and
securing communication by using an existing end-to-end second network security standard based on the public key.

7. The method of claim 1, further comprising:
receiving information indicative of which CCN devices are online, which CCN users have not expressed an interest in receiving voice calls, and which CCN users have expressed an interest in forwarding their calls; and
providing the received information outside of the CCN.

8. The method of claim 7, further comprising forwarding the voice call outside of the CCN based on the received information.

9. The method of claim 7, further comprising forwarding the voice call to a CCN voicemail system based on the received information.

10. An apparatus for facilitating voice calls over a content centric network (CCN), comprising:
a receiving mechanism configured to receive from a CCN user a CCN packet containing an expressed interest in receiving voice calls directed to the CCN user, wherein the CCN packet can be addressed, located, and disseminated by a unique and persistent CCN name, wherein the CCN name contains authentication information, and wherein the CCN packet can be self-authenticated using the authentication information;
a second receiving mechanism configured to receive from a second network a packet for a voice call directed to the CCN user, wherein the second network is not a CCN;
a first forwarding mechanism configured to forward to the CCN user the packet received from the second network with a CCN name corresponding to the interest expressed by the CCN user after translating the received packet to a CCN packet format; and
a second forwarding mechanism configured to forward a second CCN packet from the CCN user for the voice call to the second network after translating the second CCN packet to a non-CCN packet format;
wherein a device in the second network is allowed to initiate and maintain the voice call directed to the CCN user based on a CCN name associated with the voice call, without maintaining state information associated with the voice call; and
wherein the voice call is allowed to be terminated when no interest message corresponding to the voice call is received from the CCN user for a predetermined period.

11. The apparatus of claim 10,
further comprising an interest-expressing mechanism configured to express an interest in receiving outbound voice call requests from one or more CCN callers;
wherein the receiving mechanism is further configured to:
receive an outbound voice call request from a CCN caller; and
receive an interest expressed by the CCN caller in receiving packets associated with the outbound voice call;
wherein the second forwarding mechanism is further configured to forward the outbound voice call request to a second network;
wherein the receiving mechanism is further configured to, in response, receive a packet associated with the outbound voice call from the second network,
wherein the second network is not a CCN;
wherein the second forwarding mechanism is further configured to forward the packet associated with the outbound voice call to the CCN caller using a CCN name associated with the interest expressed by the CCN caller after translating the packet to a CCN packet format;
wherein the CCN caller is allowed to initiate and maintain the outbound voice call; and
wherein the outbound voice call is allowed to be terminated when no interest message corresponding to the outbound voice call is received from the CCN caller for a predetermined period.

12. The apparatus of claim 10, further comprising a voice-call termination mechanism configured to terminate the voice call after receiving from the CCN an expressed interest in not receiving voice calls directed to the CCN user.

13. The apparatus of claim 10, further comprising a load-sharing mechanism configured to share the load of facilitating voice calls to the CCN among a number of proxy servers, wherein a respective proxy server does not maintain state information associated with a voice call.

14. The apparatus of claim 10, further comprising a digital-signing mechanism configured to digitally sign a respective CCN packet associated with the voice call such that the CCN packet can be verified by one or more nodes in the CCN.

15. The apparatus of claim 10, further comprising:
a third receiving mechanism configured to receive information about a public key associated with a CCN device;
a directory configuration mechanism configured to configure a publicly available directory of public keys, thereby allowing second network endpoints to discover those keys; and
a communication security mechanism configured to secure communication by using an existing end-to-end second network security standard based on the public key.

16. The apparatus of claim 10, further comprising:
a fourth receiving mechanism configured to receive information indicative of which CCN devices are online, which CCN users have not expressed an interest in receiving voice calls, and which CCN users have expressed an interest in forwarding their calls; and
a presence-information provision mechanism configured to provide the received information outside of the CCN.

17. The apparatus of claim 16, further comprising a forwarding mechanism configured to forward the voice call to a CCN voicemail system based on the received information.

18. The apparatus of claim 16, further comprising a forwarding mechanism configured to forward the voice call outside of the CCN based on the received information.

19. A non-transitory computer-readable storage device storing instructions that when executed by a computer cause the computer to perform a method for facilitating voice calls over a content centric network (CCN), the method comprising:
receiving from a CCN user a CCN packet containing an expressed interest in receiving voice calls directed to the CCN user, wherein the CCN packet can be addressed, located, and disseminated by a unique and persistent CCN name, wherein the CCN name contains authentication information, and wherein the CCN packets can be self-authenticated using the authentication information;
receiving from a second network a packet for a voice call directed to the CCN user, wherein the second network is not a CCN;
forwarding to the CCN user the packet received from the second network with a CCN name corresponding to the interest expressed by the CCN user after translating the received packet to a CCN packet format;
forwarding a second CCN packet from the CCN user for the voice call to the second network after translating the second CCN packet to a non-CCN packet format;
allowing a device in the second network to initiate and maintain the voice call directed to the CCN user based on a CCN name associated with the voice call, without maintaining state information associated with the voice call; and
allowing the voice call to be terminated when no interest message corresponding to the voice call is received from the CCN user for a predetermined period.

20. The storage device of claim 19, wherein the method further comprises:
- expressing an interest in receiving outbound voice call requests from one or more CCN callers;
- receiving an outbound voice call request from a CCN caller;
- receiving an interest expressed by the CCN caller in receiving packets associated with the outbound voice call;
- forwarding the outbound voice call request to a second network, wherein the second network is not a CCN;
- in response, receiving a packet associated with the outbound voice call from the second network;
- forwarding the packet associated with the outbound voice call to the CCN caller using a CCN name associated with the interest expressed by the CCN caller after translating the received packet to a CCN packet format;
- allowing the CCN caller to initiate and maintain the outbound voice call; and
- allowing the outbound voice call to be terminated when no interest corresponding to the outbound voice call is received from the CCN caller for a predetermined period.

* * * * *